United States Patent [19]

Hergenrother et al.

[11] 4,247,680
[45] Jan. 27, 1981

[54] POLYPHOSPHAZENE COPOLYMERS CONTAINING ALKYL BORATE SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 941,118

[22] Filed: Sep. 8, 1978

[51] Int. Cl.³ ............................................. C08G 83/00
[52] U.S. Cl. .................................. 528/168; 528/374; 528/394; 528/399
[58] Field of Search ................ 528/399, 394, 168, 374

[56] References Cited

U.S. PATENT DOCUMENTS

| | | | |
|---|---|---|---|
| 3,164,556 | 1/1965 | Apley et al. | 528/394 |
| 4,040,843 | 8/1977 | Franko-Filipasic | 106/15 FP |

Primary Examiner—Wilbert J. Briggs, Sr.

[57] ABSTRACT

Polyphosphazene copolymers are prepared which contain randomly distributed units represented by the formulas:

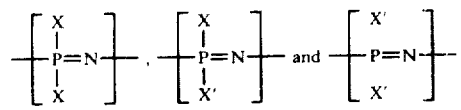

wherein X is —OB(OR)₂ in which R is a branched, straight chain or cyclic alkyl group containing from 1 to 12 carbon atoms or mixtures thereof, and wherein X' is selected from the group consisting of substituted and unsubstituted alkoxy, aryloxy, amino and mercapto groups. The alkyl groups may vary in carbon chain length within the borate or all be the same.

The copolymers of the invention can be utilized to form protective films and may also be utilized in applications such as for moldings, coatings, and the like. The copolymers of the invention also crosslink at room temperature in the presence of water yielding a solvent resistant film.

15 Claims, No Drawings

POLYPHOSPHAZENE COPOLYMERS CONTAINING ALKYL BORATE SUBSTITUENTS

BACKGROUND OF THE INVENTION

This invention relates to polyphosphazene copolymers containing repeating

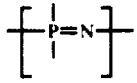

units in the polymer chain in which alkyl borate substituents and substituted and unsubstituted alkoxy, aryloxy, amino or mercapto substituents are attached to the phosphorus atom. More particularly, the invention relates to polyphosphazene copolymers containing substituents derived from alkyl borate and substituted or unsubstituted aliphatic or aromatic alcohols, amino compounds and mercaptan compounds.

Polyphosphazene copolymers containing repeating

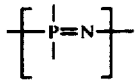

units in which various alkoxy, substituted alkoxy, aryloxy and substituted aryloxy groups are attached to the phosphorus atom and their method of preparation are described in the prior art as illustrated in the publication "Phosphorus-Nitrogen Compounds," Academic Press, New York, N.Y. 1972 by H. R. Allcock and "Poly(Organophosphazenes)," Chemtech, Sept. 19, 1975 by H. R. Allcock and in such U.S. Pat. Nos. as 3,515,688; 3,702,833; and 3,856,712.

However, none of the prior art of which applicants are aware, discloses or suggests polyphosphazene copolymers containing alkyl borate substituents attached to the phosphorus atom or methods of preparing such copolymers.

SUMMARY OF THE INVENTION

In accordance with this invention, novel polyphosphazene copolymers containing alkyl borate and substituted or unsubstituted alkoxy, aryloxy, amino or mercapto substituents are prepared.

The copolymers of the invention contain repeating units represented by the formulas:

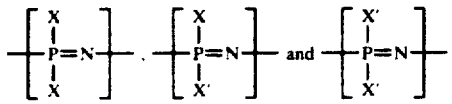

wherein X is $-OB(OR)_2$, in which R is a branched, straight chain or cyclic alkyl radical containing 1 to 12 atoms, X' is selected from the group consisting of substituted and unsubstituted alkoxy, aryloxy, amino or mercapto radicals, and the polymer can contain from 20 to 50,000 of such units. The R groups may vary in chain length within the borate.

In the copolymer units represented by the above formulas, all X substituent groups may be the same or they may be mixed and all X' substituent groups may be the same or mixed. In the mixtures, the X substituent groups may be mixtures of different alkyl borate groups and the X' substituent groups may be mixtures of alkoxy, aryloxy, amino and mercapto groups.

The specific proportion of X to X' substituent groups incorporated in the copolymers of the invention may vary considerably depending upon the particular end use for which the copolymer is intended, chemical and physical properties desired, and the degree of crosslinking desired. In general, the copolymers may contain from about 0.1 to about 55 mole percent of the X substituent and from about 45 to about 99.1 mole percent of the X' substituent. The preferred range is from about 0.5 to about 20 mole percent of the X substituent and from about 80 to about 99.5 mole percent of the X' substituent. For applications such as moldings, coatings, foams and the like, the copolymer should contain at least ten (10) percent by weight of the X substituent.

The copolymers are prepared by reacting a poly(dichlorophosphazene) having the formula $-(NPCl_2)_n-$, in which n is from 20 to 50,000, with a mixture of an alkyl borate and a substituted or unsubstituted aliphatic or aromatic alcohol, an amino compound or a mercaptan compound in the presence of a tertiary amine.

The borate reaction with the poly(dichlorophosphazene) in the presence of the tertiary amine is set out below; the remainder of the reaction with a substituted or unsubstituted aliphatic or aromatic alcohol, an amino compound or mercaptan compound is defined in the prior art.

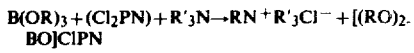

The above reaction is illustrative and shows only one chlorine substitution; it is understood that this chlorine may be replaced by a borate or one of the other substituent groups as defined above and hereinafter.

The polymers can be used to prepare films and may be utilized in applications such as molding and coatings. They also exhibit a crosslinking reaction at room temperature in the presence of water.

DETAILED DESCRIPTION OF THE INVENTION

As indicated above, the polyphosphazene polymers of this invention are prepared by reacting a poly(dichlorophosphazene) polymer having the structure $-(NPCl_2)_n-$, in which n is from 20 to 50,000 with a mixture of an alkyl borate and a substituted or unsubstituted aliphatic alcohol, aromatic alcohol, amino compound or mercaptan compound in the presence of a tertiary amine.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171 and 4,055,520 and the aforementioned publications of H. R. Allcock, the disclosures of which are incorporated herein by reference.

These polymers have the general formula $-(NPCl_2)_n-$, in which n may range from 20 to 50,000 or more. As described in the aforementioned references, the polymers are in general prepared by the thermal polymerization of cyclic oligomers having the formula $-(NPCl_2)_n-$, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about $10^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. SUBSTITUENTS

The alkyl borate which may be employed in forming the copolymers of the invention are the trialkyl borates of the general formula $B(OR)_3$ where R may be a branched, straight chain or cyclic alkyl radical and contain from 1 to 12 carbon atoms. The alkyl groups may vary from one site to another in the borate or the alkyl groups may all be identical in the borate. Illustrative examples of alkyl borates which may be suitably employed are trimethyl borate, triethyl borate, tripropyl borate and the like, tris-2-ethyl hexyl borate and the like, and tris-cyclohexyl borate and the like.

As indicated heretofore, the polyphosphazene copolymers of the invention in addition to the alkyl borate substituent group may contain substituted or unsubstituted alkoxy, aryloxy, amino or mercapto groups.

Substituent groups represented by X' for use in these copolymers are:

The alkoxy groups (substituted or unsubstituted) may be derived from aliphatic alcohols having from 1 to 20 carbon atoms such as methanol, ethanol, propanol, isopropanol, n-butanol, sec-butanol, hexane, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoropropanol, 2,2,3,3,4,4,5,5-octafluoropentanol, 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

The aryloxy groups (substituted or unsubstituted) may be derived from aromatic alcohols including among others phenol; alkylphenols such as cresols, xylenols, p-, o-, and m-ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561, incorporated herein by reference, as illustrated by aniline, halogen-substituted anilines, alkyl-substituted anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al, incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

Preferred substituent groups represented by X' are alkoxy, especially fluoroalkoxy, and aryloxy, especially substituted phenols.

The specific proportion of X to X' substituent groups incorporated in the copolymers of the invention may vary considerably depending upon the particular end use for which the copolymer is intended, chemical and physical properties desired, and the degree of crosslinking desired. In general, the copolymers may contain from about 0.1 to about 55 mole percent of the X substituent and from about 45 to about 99.1 mole percent of the X' substituent. The preferred range is from about 0.5 to about 20 mole percent of the X substituent and from about 80 to about 99.5 mole percent of the X' substituent. For applications such as moldings, coatings, foams and the like, the copolymer should contain at least ten (10) percent by weight of the X substituent.

III. THE TERTIARY AMINE

The use of the tertiary amine minimizes undesirable side reactions and at the same time acts as an effective acid scavenger.

Tertiary amines which may be employed in preparing the polymers of the invention are those represented by the general structure:

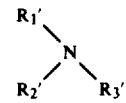

wherein $R'_1$, $R'_2$, and $R'_3$ may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N'-tetramethylethylene diamine (TMEDA), dipipyridyl ethane, 1,4 diaza bicyclo (2.2.2) octane (DABCO), N-methyl pyrolle and N-methyl morpholine can also be utilized.

The preferred tertiary amines for use in preparing the polymers of the invention are triethylamine, N,N,N',N'-tetramethylethylene diamine and pyridine.

As indicated above, the copolymers of the present invention are prepared by reacting the poly(dichlorophosphazene) polymer and the substituent mixture of an alkyl borate and a substituted or unsubstituted aliphatic alcohol, aromatic alcohol, amino compound or mercaptan compound in the presence of a tertiary amine.

The specific reaction conditions and proportion of ingredients employed in preparing these copolymers can vary somewhat depending on factors such as the reactivity of the specific substituent mixtures utilized, the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e. in order to insure substantially complete conversion of the chlorine atoms in the polymer to the corresponding ester of the active substituted mixture.

The above reaction is ordinarily carried out in the presence of a solvent. The solvent employed in the reaction should be a solvent for both the poly(dichlorophosphazene) polymer, the substituent mixture and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme triglyme, tetraglyme, toluene, xylene, cyclohexane, chloroform, dioxane, dioxalene, methylene chloride, tetrachloroethane, and tetrahydrofuran. The amount of solvent employed is not critical and any amount sufficient to solubilize the reaction mixture materials can be employed.

In general, the amount of the substituent mixture employed in the process should be at least molecularly equivalent to the number of available chlorine atoms in the polymer mixture. However, if desired, an excess of such compounds may be employed in order to insure substantially complete reaction of all the available chlorine atoms.

Also the presence of water yields crosslinks with the copolymers of this invention at room temperature; therefore, the absence of water is vital until this reaction is desired. Specifically, alkyl groups in the borate linkage in the copolymer of this invention will react with water to yield BOH on the copolymer. The BOH site will react with other borate linkages to yield B—O—B, the crosslink structure. This reaction occurs at room temperature. Its rate is controlled by the amount of borate or water present. The resulting crosslinked product is readily realized and has solvent resistance.

The following examples are submitted for the purpose of further illustrating the nature of the present invention and is not intended as a limitation on the scope thereof. Parts and percentages referred to in the examples are by weight unless otherwise indicated.

EXAMPLE I

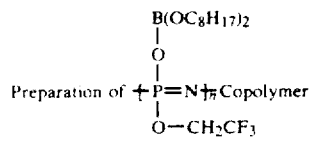

Preparation of $+P=N+_{\overline{n}}$ Copolymer

To a 10 ounce beverage bottle was charged 13.13 gms. (44 millimoles) tris-2-ethyl hexyl borate, B(OC$_8$H$_{17}$)$_3$, 100 cc of dry tetrahydrofuran (hereinafter THF), 12.3 cc (88 millimoles) of triethylamine, 3.2 cc (44 millimoles) of trifluoroethanol, and 30.3 gms. of a 15.3% poly(dichlorophosphazene) polymer in THF (4.64 gms., 40.0 millimoles) having a degree of polymerization of about 2600. After 20 hrs. in a 120° C. rotary bath, the reaction was cooled and the triethylamine salt of 2-ethyl hexyl chloride and triethylamine hydrochlorate settled out of solution and no PCL bonds could be detected by Infrared spectroscopy.

A film of this copolymer was cast on a glass plate which was soluble in THF after two weeks exposure to air. After six weeks exposure to air the film was crosslinked as evidenced by its insolubility in THF.

A coagulation in hexane give 2.94 gms. of a tan rubbery material which became hard on standing.

An analysis of the crosslinked product gave: C, 28.63%; H, 5.04%; N, 8.65%; P, 14.09%; Cl, 3.26% It was calculated that this product contained 12.67% triethylamine hydrochloride and 21.42% hydrolyzed chloropolymer.

The solid polymer when pressed at 175° C. under a pressure of 2000 psi formed a smooth, clear continuous film.

EXAMPLE II

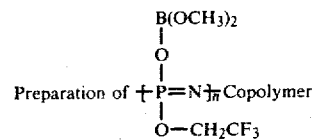

Preparation of $+P=N+_{\overline{n}}$ Copolymer

The experiment of Example I was repeated substituting 4.58 gms. (44 millimoles) of trimethyl borate, B(OCH$_3$)$_3$ for the tris-2-ethyl hexyl borate. The other ingredients and conditions were identical. After methanol washing 3.5 gms. of insoluble products was realized.

In this example, the trifluoroethanol was added prior to the trimethyl borate. This was necessary as the borate would react too fast and crosslinkage would occur in the reaction vessel with a resulting unusable product.

EXAMPLE III

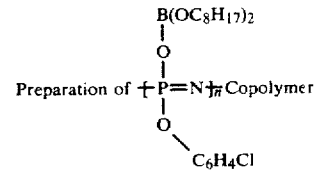

Preparation of $+P=N+_{\overline{n}}$ Copolymer

To a 10 ounce beverage bottle was charged 6.57 gms. (22 millimoles) tris-2-ethyl hexyl borate, B(OC$_8$H$_{17}$)$_3$, 100 cc of dry, alcohol free chloroform, 12.3 cc (88 millimoles) of triethylamine, 8.49 gms. (66 millimoles) of p-chlorophenol, and 42.5 gms. of a 10.93% poly(dichlorophosphazene) polymer in cyclohexane (40.1 millimoles) having a degree of polymerization of about 2600. After 20 hrs. in a 120° C. oven, a clear, yellow viscous resulted. After cooling to 25° C., triethylamine hydrochloride crystalized out. Infrared spectroscopy showed no PCL band at 600 cm$^{-1}$ and strong, new bands at 558, 540 and 480 cm$^{-1}$.

The solution was cast and, after drying two days in air, a rubbery, tetrahydrofuran insoluble, film resulted.

We claim:

1. A polyphosphazene copolymer containing randomly distributed units represented by the formulas:

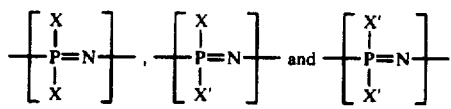, and 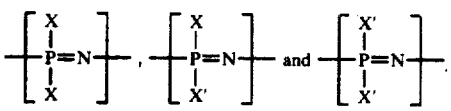

wherein X is —OB(OR)$_2$ in which R is a branched, straight chain or cyclic alkyl group containing 1 to 12 carbon atoms or mixtures thereof, and wherein X' is selected from the group consisting of substituted and unsubstituted alkoxy, aryloxy, amino and mercapto groups and wherein said copolymer contains from 20 to 50,000 of said units.

2. The copolymer of claim 1 wherein both R groups are identical.

3. The copolymer of claim 1 wherein the R groups are dissimilar.

4. The copolymer of claim 1 wherein the X substituent is between about 0.1 and about 55 mole percent and the X' substituent is between about 45 and 99.1 mole percent.

5. The copolymer of claim 1 wherein the X substituent is —OB(OC$_8$H$_{17}$)$_2$ and the X' substituent is —OCH$_2$CF$_3$.

6. The copolymer of claim 1 wherein the X substituent is —OB(OC$_8$H$_{17}$)$_2$ and the X' substituent is —OC$_6$H$_4$Cl.

7. The copolymer of claim 1 wherein the X substituent is —OB(OCH$_3$)$_2$ and the X' substituent is —OCH$_2$CF$_3$.

8. A method of preparing polyphosphazene copolymers containing randomly distributed units represented by the formulas:

wherein X is —OB(OR)$_2$ in which R is a straight, branched chain or cyclic alkyl radical containing from 1 to 12 carbon atoms or mixtures thereof, and wherein X' is selected from the group consisting of substituted and unsubstituted alkoxy, aryloxy, amino or mercapto groups; said method comprising reacting a poly(dichlorophosphazene) polymer having the formula —(NPCl$_2$)$_n$—, wherein n is from 20 to 50,000, with a mixture consisting of a trialkyl borate and a substituted or unsubstituted aliphatic alcohol, aromatic alcohol, an amino compound or a mercaptan compound in the presence of a tertiary amine.

9. The method of claim 8 wherein said trialkyl borate is tris-2-ethyl hexyl borate.

10. The method of claim 8 where said trialkyl borate is trimethyl borate.

11. The method of claim 8 wherein the X substituent is between about 0.5 and about 55 mole percent and the X' substituent is between about 45 and about 99.1 mole percent.

12. The method of claim 8 where said mixture consists of tris-2-ethyl hexyl borate and trifluoroethanol.

13. The method of claim 1 wherein said mixture consists of tris-2-ethyl hexyl borate and p-chlorophenol.

14. The method of claim 8 wherein said mixture consists of trimethyl borate and trifluoroethanol.

15. The method of claim 8 wherein said tertiary amine is triethylamine.

* * * * *